United States Patent
Allan et al.

(10) Patent No.: US 11,034,613 B2
(45) Date of Patent: Jun. 15, 2021

(54) METHODS FOR ION EXCHANGING GLASS ARTICLES

(71) Applicant: Corning Incorporated, Corning, NY (US)

(72) Inventors: Douglas Clippinger Allan, Corning, NY (US); Konstantin Sergeevich Koreshkov, St. Petersburg (RU); Christopher Lee Timmons, Big Flats, NY (US)

(73) Assignee: Corning Incorporated, Corning, NY (US)

( * ) Notice: Subject to any disclaimer, the term of this patent is extended or adjusted under 35 U.S.C. 154(b) by 235 days.

(21) Appl. No.: 16/189,242

(22) Filed: Nov. 13, 2018

(65) Prior Publication Data

US 2019/0152847 A1    May 23, 2019

Related U.S. Application Data

(60) Provisional application No. 62/589,239, filed on Nov. 21, 2017.

(51) Int. Cl.
  *C03C 21/00* (2006.01)
  *C03C 3/085* (2006.01)

(52) U.S. Cl.
  CPC .......... *C03C 21/002* (2013.01); *C03C 3/085* (2013.01)

(58) Field of Classification Search
  None
  See application file for complete search history.

(56) References Cited

U.S. PATENT DOCUMENTS

| | | | |
|---|---|---|---|
| 3,441,398 | A | 4/1969 | Hess |
| 3,711,393 | A | 1/1973 | Garfinkel |
| 8,561,429 | B2 | 10/2013 | Allan et al. |
| 8,980,777 | B2 | 3/2015 | Danielson et al. |

(Continued)

FOREIGN PATENT DOCUMENTS

GB    1218093 A  *  1/1971  ............. C04B 41/00

OTHER PUBLICATIONS

Araujo et al; "Ion Exchange Equilibria Between Glass and Molten Salts"; Journal of Non-Crystalline Solids; 318 (2003) pp. 262-267.

(Continued)

*Primary Examiner* — Lisa L Herring
(74) *Attorney, Agent, or Firm* — Michael G. Panian (57) ABSTRACT

A method for ion exchanging glass articles is provided. The method includes ion exchanging a plurality of lots in steps within an ion exchange salt bath, wherein each of the plurality of lots comprises at least one glass article, and wherein the ion exchange salt bath comprises molten salt and, after removing the last lot from the ion exchange salt bath, removing substantially the entire volume of molten salt from the ion exchange salt bath. The method further includes maintaining steady state conditions in the ion exchange salt bath prior to removing substantially the entire volume of salt from the ion exchange salt bath such that at least one of the compressive stress and the central tension of substantially all of the glass articles varies from at least one of the compressive stress and the central tension of any other of the glass articles by less than about 20%.

25 Claims, 3 Drawing Sheets

(56) References Cited

U.S. PATENT DOCUMENTS

| | | | |
|---|---|---|---|
| 2005/0215664 A1* | 9/2005 | Elwakil | B32B 17/10761 |
| | | | 523/160 |
| 2012/0216565 A1 | 8/2012 | Allan et al. | |
| 2012/0216569 A1 | 8/2012 | Allan et al. | |
| 2013/0128416 A1* | 5/2013 | Weber | C03C 21/002 |
| | | | 361/679.01 |
| 2013/0219965 A1 | 8/2013 | Allan et al. | |
| 2014/0109616 A1 | 4/2014 | Varshneya | |
| 2014/0356406 A1* | 12/2014 | Patil | C03C 21/005 |
| | | | 424/411 |
| 2016/0251262 A1* | 9/2016 | Gomez | C03C 21/002 |
| | | | 65/30.14 |

OTHER PUBLICATIONS

Beall et al; "Method of Purifying Ion Exchange Baths"; Filed As U.S. Appl. No. 13/272,595, filed Oct. 13, 2011; 27 Pages.
International Search Report and Written Opinion PCT/US2018/062066 dated Feb. 20, 2019, 11 Pgs.

* cited by examiner

METHODS FOR ION EXCHANGING GLASS ARTICLES

RELATED APPLICATIONS

This application claims the benefit of priority under 35 U.S.C. § 119 of U.S. Provisional Application Ser. No. 62/589,239 filed on Nov. 21, 2017, the contents of which are relied upon and incorporated herein by reference in their entirety as if fully set forth below.

FIELD

The present disclosure generally relates to ion exchange systems and methods for ion exchanging glass articles and, more specifically, to ion exchange systems and methods for maintaining and controlling such systems.

BACKGROUND

Historically, glass has been used as a preferred material for many applications, including food and beverage packaging, pharmaceutical packaging, kitchen and laboratory glassware, and windows or other architectural features, because of its hermeticity, optical clarity and excellent chemical durability relative to other materials.

However, use of glass for many applications is limited by the mechanical performance of the glass. In particular, glass breakage is a concern, particularly in the packaging of food, beverages, and pharmaceuticals. Breakage can be costly in the food, beverage, and pharmaceutical packaging industries because, for example, breakage within a pharmaceutical filling line may require that neighboring unbroken containers be discarded as the containers may contain fragments from the broken container. Breakage may also require that the filling line be slowed or stopped, lowering production yields. Further, non-catastrophic breakage (i.e., when the glass cracks but does not break) may cause the contents of the glass package or container to lose their sterility which, in turn, may result in costly product recalls.

One root cause of glass breakage is the introduction of flaws in the surface of the glass as the glass is processed and/or during subsequent filling. These flaws may be introduced in the surface of the glass from a variety of sources including contact between adjacent pieces of glassware and contact between the glass and equipment, such as handling and/or filling equipment. Regardless of the source, the presence of these flaws may ultimately lead to glass breakage.

Ion exchange processing is a process used to strengthen glass articles. Ion exchange imparts a compression (i.e., compressive stress) onto the surface of a glass article by chemically replacing smaller ions within the glass article with larger ions from a molten salt bath. The compression on the surface of the glass article raises the mechanical stress threshold to propagate cracks; thereby, improving the overall strength of the glass article. Surface compression and depth of layer are dependent on the ion exchange processing time and temperature. The center tension evolves in the center of the glass thickness to counteract the surface compression. While time and temperature are increased to increase depth of layer, the surface compression decreases over time due to stress relaxation and due to force balance which reduces the strength of the glass article. The combination of the center tension, depth of layer and surface compression can all contribute to the functional performance of the parts.

Generally during conventional ion exchange processing, the concentration of smaller ions in the ion exchange bath increases while the concentration of larger ions in the ion exchange bath decreases, eventually reaching a concentration in which the concentration of larger ions is too low to maintain a high enough concentration in equilibrium with the glass surface, causing the surface compressive stress falls below a target value. Prior to reaching such concentrations, it is conventional to replace the entire ion exchange bath. One technique for accounting for these changes in ion-concentration includes beginning with fresh salt in the ion exchange bath that has a relatively high concentration of larger ions. This effectively achieves a compressive stress and a central tension that could be well above the targeted compressive stress and central tension. While providing such a relatively large concentration of larger ions ensures that several glass articles can be processed in the same ion exchange bath to achieve a compressive stress and central tension above a targeted minimum limit, such a technique also results in different compressive stresses and central tensions for each of the several glass articles. Additionally, conventional ion exchange processing, depending on the targeted product attributes, may lead to increased costs as a result of inefficient use of salt in the ion exchange bath, loss of salt during the normal process and also the downtime associated with halting the process to replace the entire ion exchange bath.

SUMMARY

According to embodiments of the present disclosure, a method for ion exchanging glass articles is provided. The method includes ion exchanging a plurality of lots in steps within an ion exchange salt bath, wherein each of the plurality of lots having at least one glass article, and wherein the ion exchange salt bath including molten salt. After ion exchanging, the method further includes removing one of the plurality of lots from the ion exchange salt bath, and except for after removing the last of the plurality of lots from the ion exchange salt bath, placing a subsequent lot into the ion exchange salt bath. After removing the last lot from the ion exchange salt bath, the method also includes removing substantially the entire volume of molten salt from the ion exchange salt bath. The method further includes maintaining steady state conditions in the ion exchange salt bath prior to removing substantially the entire volume of salt from the ion exchange salt bath such that at least one of the compressive stress and the central tension of substantially all of the glass articles varies from at least one of the compressive stress and the central tension of any other of the glass articles by less than about 20%.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

The disclosure will be understood more clearly from the following description and from the accompanying figures, given purely by way of non-limiting example, in which.

DETAILED DESCRIPTION

Reference will now be made in detail to the present embodiment(s), an example(s) of which is/are illustrated in the accompanying drawings. Whenever possible, the same reference numerals will be used throughout the drawings to refer to the same or like parts.

The singular forms "a," "an" and "the" include plural referents unless the context clearly dictates otherwise. The endpoints of all ranges reciting the same characteristic are independently combinable and inclusive of the recited endpoint. All references are incorporated herein by reference.

As used herein, "have," "having," "include," "including," "comprise," "comprising" or the like are used in their open ended sense, and generally mean "including, but not limited to."

All scientific and technical terms used herein have meanings commonly used in the art unless otherwise specified. The definitions provided herein are to facilitate understanding of certain terms used frequently herein and are not meant to limit the scope of the present disclosure.

The present disclosure is described below, at first generally, then in detail on the basis of several exemplary embodiments. The features shown in combination with one another in the individual exemplary embodiments do not all have to be realized. In particular, individual features may also be omitted or combined in some other way with other features shown of the same exemplary embodiment or else of other exemplary embodiments.

Embodiments of the present disclosure relate to ion exchange methods in which steady state conditions are maintained and to ion exchange systems configured to maintain steady state conditions. As compared to conventional ion exchange processes, the ion exchange methods and systems as described herein reduce the number of salt bath changes and the overall amount of salt used during ion exchange processing of glass articles. As a result, the methods and systems described herein achieve more efficient salt usage and reduce costs associated with ion exchange processing of glass articles. Additionally, a reduction in the number of salt bath changes also leads to a reduction in the downtime of the ion exchange system and further increases the efficiency of the ion exchange process.

The methods and systems as described herein also eliminates the variability in compressive stresses (CS), central tensions (CT) and depth of layer (DOL) common in conventional ion exchange processes and, in effect, achieves more consistent attributes for substantially all glass articles processed in accordance with embodiments of the present disclosure.

As used herein, the term "conventional ion exchange process" refers to an ion exchange process in which smaller alkali metal ions in a glass article are exchanged for larger alkali metal ions to impart a compressive stress in the glass article, wherein the ion exchange process is carried out for a sequence of glass articles or a sequence of batches of pluralities of glass articles, in the same salt bath.

Generally during ion exchange processing, a glass article is placed in an ion exchange or salt bath at a constant temperature, for example, a selected temperature between 380° C.-550° C., for a predetermined period of time, for example, in the range of about 1 hour to about 10 hours. The entire glass article, or only a portion of the glass article, may be immersed in the ion exchange bath during the ion exchange process. Optionally, a single glass article may be immersed in the ion exchange bath during the ion exchange process, or a plurality of glass articles may be immersed in the ion exchange bath at the same time. Where a plurality of glass articles are processed, the plurality of glass articles may be subdivided into smaller groups, "runs," or lots, which undergo ion exchange in the salt bath in succession.

Glass articles as described herein may be formed from alkali aluminosilicate glass compositions which are amenable to strengthening by ion exchange. Such composition generally include a combination of $SiO_2$, $Al_2O_3$, at least one alkaline earth oxide, and one or more alkali oxides, such as $Na_2O$ and/or $K_2O$. The glass composition may be free from boron and compounds containing boron. The glass compositions may further comprise minor amounts of one or more additional oxides such as, for example, $SnO_2$, $ZrO_2$, $ZnO$, $TiO_2$, $As_2O_3$, or the like. These components may be added as fining agents and/or to further enhance the chemical durability of the glass composition. For example, glass articles as described herein my be formed from the ion exchangeable glass composition described in granted U.S. Pat. No. 8,980,777 filed Oct. 25, 2012 entitled "Glass Compositions with Improved Chemical and Mechanical Durability" the contents of which are incorporated herein by reference in their entirety.

Exemplarily glass compositions that glass articles as described herein may be formed from include glass compositions which meet the criteria for pharmaceutical glasses described by regulatory agencies such as the USP (United States Pharmacopoeia), the EP (European Pharmacopeia), and the JP (Japanese Pharmacopeia) based on their hydrolytic resistance. Per USP 660 and EP 7, borosilicate glasses meet the Type I criteria and are routinely used for parenteral packaging. Examples of borosilicate glass include, but are not limited to Corning® Pyrex® 7740, 7800 and Wheaton 180, 200, and 400, Schott Duran, Schott Fiolax, KIMAX® N-51A, Gerrescheimer GX-51 Flint and others. Soda-lime glass meets the Type III criteria and is acceptable in packaging of dry powders which are subsequently dissolved to make solutions or buffers. Type III glasses are also suitable for packaging liquid formulations that prove to be insensitive to alkali. Examples of Type III soda lime glass include Wheaton 800 and 900. De-alkalized soda-lime glasses have higher levels of sodium hydroxide and calcium oxide and meet the Type II criteria. These glasses are less resistant to leaching than Type I glasses, but more resistant than Type III glasses. Type II glasses can be used for products that remain below a pH of 7 for their shelf life. Examples include ammonium sulfate treated soda lime glasses. These pharmaceutical glasses have varied chemical compositions and have a coefficient of linear thermal expansion (CTE) in the range of $20\text{-}85 \times 10^{-7\circ}$ $C.^{-1}$.

Generally, the ion exchange bath may include a first cation and a second cation wherein the first cation is larger than the second cation. At the beginning of the ion exchange process, the bath may include only the first cation. Optionally, the second cation may be intentionally included in the bath at the beginning of the ion exchange process. In either case, the second cation is introduced into the bath during the ion exchange process. The ion exchange bath may include, for example, a potassium salt such as potassium nitrate ($KNO_3$) and a small amount of the corresponding sodium salt ($NaNO_3$), which may be present as a contaminant or intentionally added to the bath, with the K+ ion being the first cation and the Na+ ion being the second cation. After the ion exchange is considered to be complete the glass article is removed and washed to remove excess salt from the ion exchange bath. This process is repeated for additional glass articles in the same ion exchange bath until the salt in the ion exchange bath no longer provides a high enough surface concentration to achieve a CS above a targeted CS, a CT above a targeted CT, or a DOL above the targeted DOL. As ion exchange processing is performed on each glass article, the concentration of smaller cations in the ion exchange bath increases while the concentration of larger cations in the ion exchange bath decreases, eventually reaching a concentration in which too few larger cations are available to be exchanged for the smaller cations in the glass article. This phenomenon is referred to as "poisoning" of the bath. As used herein, the terms "poisoning ions" and "poisoning cations" refer to the smaller cations that leave the glass and enter the ion exchange/salt bath during the ion exchange process and "poisoning salt" refers to the salts of such cations. The increase in concentration of poisoning cations as ion exchange progresses causes gradual deterioration of the CS, CT and DOL over time for glass articles that are subsequently ion exchanged in the same salt bath. In a conventional ion exchange process, the entire ion exchange bath is replaced prior to reaching a concentration in which too few larger cations are available to be exchanged for the smaller ions in the glass article.

To account for these changes of ion-concentration in the ion exchange bath, initial salt concentration, or in other words, the salt concentration of the ion exchange bath at the beginning of the ion exchange process, contains a relatively high concentration of larger ions. Such a relatively high concentration of larger ions causes the initial glass articles processed in an ion exchange process to have a CS, a CT and/or a DOL well above the targeted CS, CT and DOL. Continued processing of subsequent glass articles results in a CS, a CT and/or a DOL that is lower than the CS, CT and/or DOL of the previous glass article, though higher than the targeted CS, CT and/or DOL. While providing such a high concentration of larger ions ensures that several glass articles can be processed in the same ion exchange bath to achieve at least a targeted CS, CT and/or DOL, such a technique also results in a variation of CS, CT and/or DOL for each of the several glass articles.

An alternative approach to account for these changes of ion-concentration in the ion exchange bath includes lowering the temperature of the ion exchange bath and increasing the time at which glass articles are processed in the ion exchange bath. Such approach may permit the CS and/or DOL to not significantly vary between batches of glass articles processed in the same ion exchange bath. Generally, the temperature may be lowered continually until the processing time becomes too low to be economically beneficial. While this methodology has the advantage of extending the life of the ion exchange bath, extending the life of the ion exchange bath by lowering the bath temperature is performed at the expense of taking more time to ion-exchange. Additionally, this methodology adds complexity to the ion exchange process.

As an additional approach to account for changes of ion-concentration in the ion exchange bath, the poisoning cations may be removed from the ion exchange bath through various methods. For example, the ion exchange bath may include a getter material that selectively removes certain cationic species or reduces the concentration of the cationic species in the ion exchange bath. In particular, the getter material may selectively remove the poisoning cations from the ion exchange bath as a result of, for example, reaction of the getter material with the poisoning cations being thermodynamically and/or kinetically more favorable than reaction of the getter material with the other ions in the ion exchange bath. The getter material may include, for example, a slightly enriched (i.e., greater than stoichiometric) concentration of the larger cations and selectively remove the poisoning cations from the ion exchange bath through a so-called "reverse" ion exchange process. In such a "reverse" ion exchange process, the poisoning cations in the bath undergo ion exchange with the larger cations in the getter material, thereby removing at least some of the poisoning cations from the bath while releasing larger cations into the bath. Thus, the concentration of the larger cations in the ion exchange bath may be replenished while simultaneously decreasing the concentration of the poisoning cations in the bath.

Where an ion exchange process is intended to exchange, for example, potassium from a salt bath with a smaller cation in the glass article, the getter material may be a potassium-rich silicate glass or glass ceramic. The glass or glass ceramic may be introduced into the ion exchange bath, where poisoning cations, from the salt bath may exchange with potassium cations in the getter material. Alternatively, the getter material may include a naturally occurring or synthetic ceramic material, clay, or zeolite. It should be appreciated that getter materials in accordance with embodiments of the present disclosure may include any combination or mixture of the materials described hereinabove.

The smaller cations may also be removed from the ion exchange bath through the use of an electrolytic system which includes a cathode having a membrane formed from a material having a high selectivity for a target small ion (for example Na+) and facilitates removal of the smaller cations without reducing the concentration of the larger cations in the ion exchange bath. The membrane may be, for example, a glass membrane. Such an electrolytic system is described, for example, in U.S. Pat. No. 3,711,393, the contents of which are incorporated herein by reference in their entirety.

Figure 1:
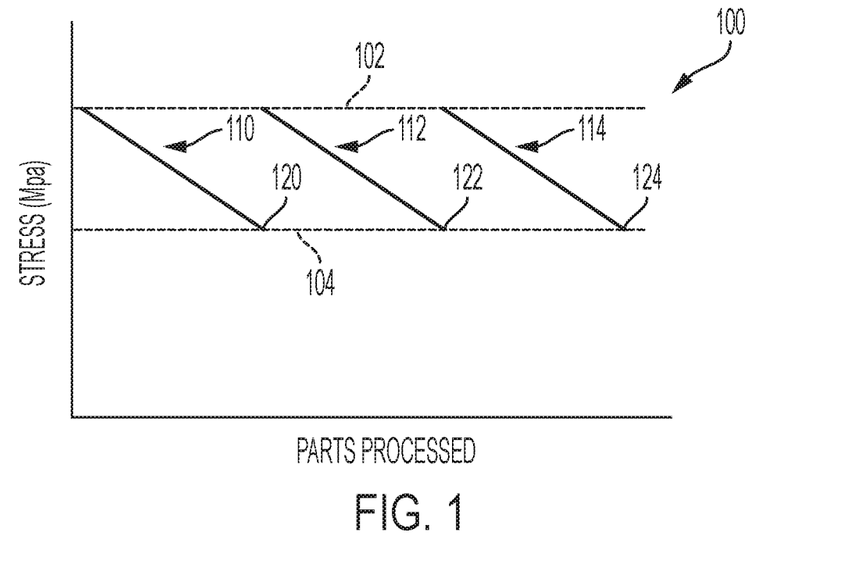
FIG. 1 is a graph depicting a conventional ion exchange process.

FIG. 1 is a graph 100 generally depicting a conventional ion exchange process. As shown, a targeted upper limit 102 and a targeted lower limit 104 for CS and/or CT are predetermined and conditions of the ion exchange bath used in the ion exchange process are controlled such that glass articles strengthened in the ion exchange bath have a CS and/or CT that is between the targeted upper limit 102 and the targeted lower limit 104. FIG. 1 further shows that such an ion exchange process conventionally includes ion exchange bath conditions which initially achieve a CS and/or CT that is approximately the targeted upper limit 102. With each glass article that is strengthened in the ion exchange bath, the CS and/or CT progressively decreases until a CS and/or CT that is approximately the targeted lower limit 104 is achieved. Graph 100 depicts multiple ion exchange runs 110, 112 and 114 wherein a plurality of ion exchange steps are performed for each ion exchange run 110, 112 and 114. As used herein, the term "ion exchange step" refers to a step in which at least one glass article is ion exchanged until a target CS and/or CT is achieved. An ion exchange step may include inserting the at least one glass article into the ion exchange bath more than once and may include removing the at least one glass article from the ion exchange bath more than once. Once the target CS and/or CT is achieved, the ion exchange step is complete and a subsequent ion exchange step may begin by ion exchanging another at least one glass article. For purposes of clarity, an ion exchange step may include ion exchanging one glass article or may include ion exchanging a plurality of glass articles. As exemplified in graph 100, run 110 proceeds until the targeted lower limit 104 is achieved. At that time, the ion exchange bath is drained and then refilled with fresh salt at point 120. Subsequent run 112 then begins in the refreshed salt and similarly proceeds until the targeted lower limit 104 is achieved, at which point 122 the ion exchange bath is again drained and again refilled with fresh salt.

While the exchange of larger cations in the ion exchange bath for smaller cations in the glass article represents an expected consumption of the larger cations in the ion exchange bath, the larger cations in the ion exchange bath may also be removed in other ways. For example, salt, referred to as dragout, may adhere to the surface of the glass article, or to the surface of any fixture or carrier which contacts the glass article in the ion exchange bath, and may exit the bath when the glass article and/or the fixture or carrier is removed from the bath. As used herein, the term "dragout" excludes any salt that drips off the glass article and/or the fixtures and returns to the ion exchange bath. As previously noted, dragout is conventionally washed off the glass article and/or the fixtures without being recovered. Thus, dragout may further reduce the availability of all cations in the ion exchange bath and increase the rate at which the CS and/or CT decreases during ion exchange processing.

For conventional ion exchange processes the accumulation of poisoning ions in an ion exchange bath may be modeled using a mass balance analysis based on a continuously stirred tank reactor (CSTR). Equation 1 details the basic mass balance starting point:

$$\text{ACCUMULATION} = \text{IN} - \text{OUT} + \text{GENERATION} \tag{1}$$

where the term IN is the smaller cation concentration of the fresh salt added to the ion exchange bath at the beginning of the ion exchange process; the term OUT is the smaller cation concentration of salt which is removed from the ion exchange bath as a result of dragout; and the term GENERATION is the concentration of poisoning cations that leave the glass article and enter the ion exchange bath.

Equation 1 may be written as a differential equation, as shown in Equation 2, in which individual articles, or individual lots of a plurality of glass articles, are treated as continuous and in which the poisoning cation concentration is treated as time dependent:

$$V_{salt}\frac{dC}{dt} = G - R - V_{dragout}(C - C_0) \tag{2}$$

where $V_{salt}$ is the volume of the ion exchange bath; G is the concentration of poisoning cations that leave the glass article and enter the ion exchange bath; R is any removal of poisoning cations from the ion exchange bath by means others than dragout; $V_{dragout}$ is the volume rate, or in other words the volume per unit time, of salt containing poisoning cations removed from the ion exchange bath as a result of dragout; C is the volumetric concentration of poisoning cations in the ion exchange bath at a time subsequent to the beginning of the ion exchange process; and $C_0$ is the volumetric concentration of poisoning cations in the fresh salt added to the ion exchange bath at the beginning of the ion exchange process.

Equation 2 can be solved assuming that $V_{dragout}$, R and G are relatively constant and further assuming $V_{salt}$ is maintained as relatively constant by replenishment of the ion exchange bath through the addition of fresh salt of concentration $C_0$. The solution is shown in Equation 3:

$$C(t) = C_0 + \frac{G'}{V_{dragout}}\left(1 - e^{-\frac{V_{dragout}}{V_{salt}}t}\right) \tag{3}$$

where t is time and G' is the difference between the concentration of poisoning cations that leave the glass article and enter the ion exchange bath and the any removal of poisoning cations from the ion exchange bath by means others than dragout. In other terms, G' equals G−R and may be referred to herein as net poisoning cation generation.

As can be understood from Equation 3, at the beginning of the ion exchange process, or time zero (where t=0), $C(t=0)=C_0$. However, for steady state conditions time is considered to approach infinity (where t→∞) and Equation 3 can be written as Equation 4:

$$C_{steady\ state} = C_0 + \frac{G'}{V_{dragout}} \tag{4}$$

As used herein, the term "steady state" refers to a substantially constant or regular value over a period of time. Steady state conditions account for some variation in the value, but provide for an expected output or result to be relatively constant over time. With regard to the present disclosure, a steady state ion exchange process is one in which CS and/or CT are substantially constant or regular over the period of time that the ion exchange process is performed. Where the steady state ion exchange process includes ion exchanging a plurality of glass articles, the CS and/or CT of substantially all of the glass articles may vary from the CS and/or CT of any other of the glass articles by less than about 20%. It is recognized that some of the glass articles may have a CS and/or CT that varies the CS and/or CT of the other glass articles and use of the term "substantially all of the glass articles" refers to less than 100% of the glass articles, but greater than about 90% of the glass articles. According to embodiments of the present disclosure, the CS and/or CT of substantially all of the glass articles may vary from the CS and/or CT of any other of the glass articles by less than about 10%, or less than about 5.0%, or less than about 3.0%, or even less than about 2.0%.

Equation 4 shows that a steady state ion exchange bath contains a higher concentration of poisoning cations than $C_0$ by the ratio of net poisoning cation generation to the volume of salt removed from the ion exchange bath as a result of dragout. As such, a steady state ion exchange process as described herein may generally be maintained by maintaining a concentration of poisoning cations in the ion exchange bath that is higher than the concentration of poisoning cations in a conventional ion exchange process for almost the entire conventional ion exchange process.

Figure 2:
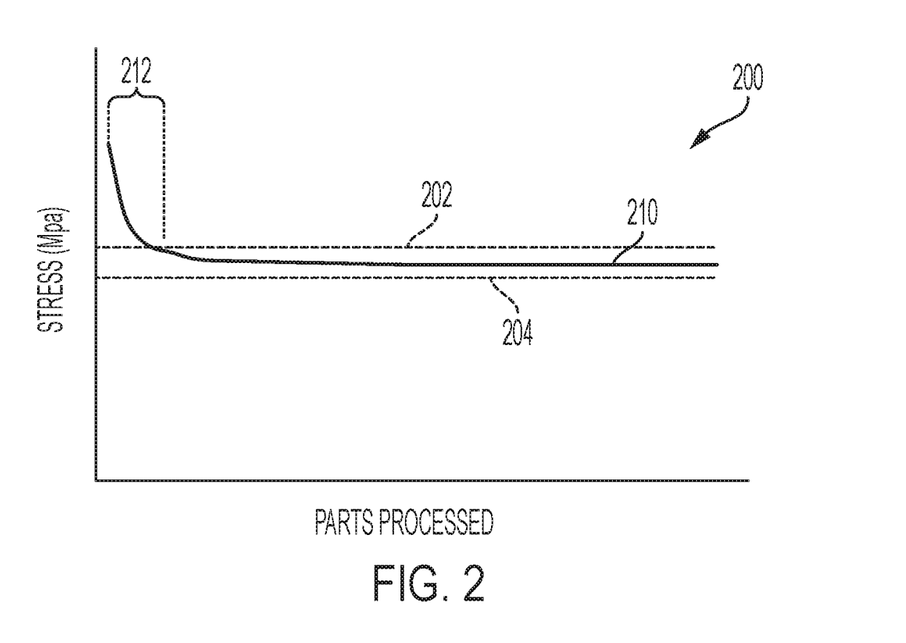
FIG. 2 is a graph depicting a steady state ion exchange process in accordance with embodiments of the present disclosure.

Embodiments of the present disclosure provide a steady state ion exchange process. FIG. 2 is a graph 200 generally depicting a steady state ion exchange process in accordance with embodiments of the present disclosure. As shown, a targeted upper limit 202 and a targeted lower limit 204 for CS and/or CT are predetermined and conditions of the ion exchange bath used in the ion exchange process are controlled such that substantially all of the glass articles strengthened in the ion exchange bath have a CS and/or CT that is between the targeted upper limit 202 and the targeted lower limit 204. As shown in FIG. 2 the steady state ion exchange process includes a start-up period 220 in which the initial glass articles processed in the ion exchange bath achieve a CS and/or CT that is greater than the targeted upper limit 202. After a short period of time, the CS and/or CT quickly decrease until a CS and/or CT that is between the targeted upper limit 202 and the targeted lower limit 204 is achieved. As will be explained in more detail below, the conditions of the ion exchange bath are maintained such that the CS and/or CT of the processed glass articles remain between the targeted upper limit 202 and the targeted lower limit 204 for the entire ion exchange process. Notably, in contrast to the conventional ion exchange process illustrated in FIG. 1, the steady state ion exchange process shown in FIG. 2 can achieve a smaller variance between the targeted upper limit 202 and the targeted lower limit 204. Additionally, because the process maintains steady state conditions, the frequency with which substantially the entire volume of the ion exchange bath needs to be drained and then refilled with fresh salt is either substantially reduced, or entirely eliminated.

Figure 3:
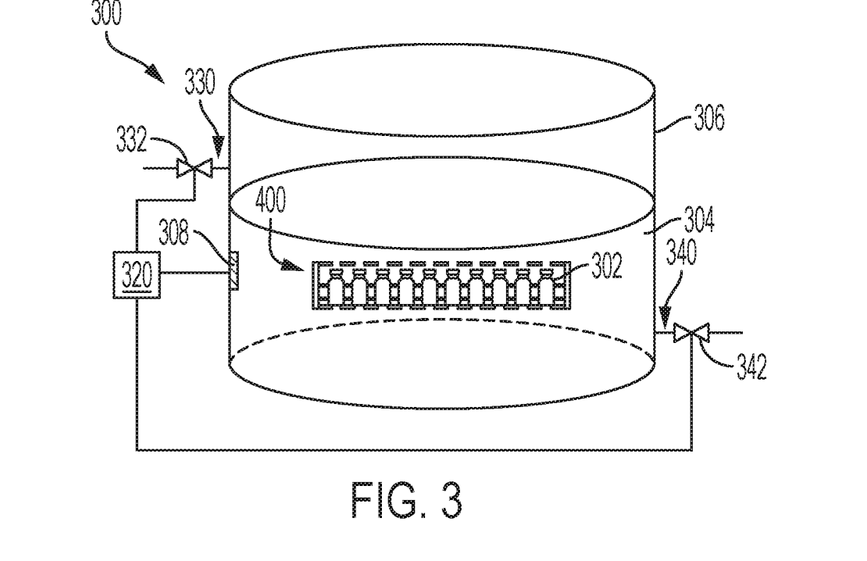
FIG. 3 schematically illustrates a steady state ion exchange system in accordance with embodiments of the present disclosure.

FIG. 3 schematically illustrates a steady state ion exchange system in accordance with embodiments of the present disclosure. In FIG. 3 an ion exchange system 300 is shown including a vessel 306 for containing a salt bath 304. As shown, a glass article 302 may be at least partially immersed in the salt bath within the vessel 306. For example, the glass article 302 may be a glass container and, as shown in FIG. 3, may be a plurality of glass containers. Merely for purposes of illustrating the system 300, the glass containers are shown contained in a magazine apparatus 400 which will be described in more detail below. The glass article 302 includes a plurality of substrate metal ions which are alkali metal ions (e.g., $Li^+$, $Na^+$, $K^+$). The salt bath 304 includes a plurality of first metal cations (e.g., $K^+$) at a first metal ion concentration, and a plurality of second metal cations (e.g., $Na^+$) at a second metal ion concentration. The first metal cations and second metal cations may be introduced into the salt bath 304 as first and second metal salts (e.g., $KNO_3$ and $NaNO_3$ respectively). The ion exchange system 300 as described herein may include at least one apparatus for heating the bath 304 (not shown) to an ion exchange temperature, the ion exchange temperature generally being a temperature in which both the first and second metal salts are molten.

The ion exchange system 300 may also include a processor 320 configured to receive, monitor and/or evaluate vessel condition data. For example, the processor may receive measurements of temperature conditions from a temperature sensor 308 disposed within the salt bath 304. In addition, the processor 320 may also be configured to evaluate the concentration of the first metal ion based at least in part on an ion consumption rate model (not shown) for the first metal ion. The metal ion consumption rate model may be predetermined through experimentation and determination of reaction rate constants and orders.

The ion exchange system 300 may further include an inlet 330 through which fresh salt may be introduced into the vessel 306. The inlet 330 may include a valve 332 communicatively coupled to the processor 320. As such, the processor 320 may be further configured to operate the valve 332 based on evaluation of the vessel condition data. For example, the processor 320 may open the valve 332 to add fresh salt through the inlet 330 and may close the valve 332 to prevent addition of fresh salt through the inlet 330.

The ion exchange system 300 may further include an outlet 340 through which molten salt may be removed from the vessel 306. The outlet 340 may include a valve 342 communicatively coupled to the processor 320. As such, the processor 320 may be further configured to operate the valve 342 based on evaluation of the vessel condition data. For example, the processor 320 may open the valve 342 to remove molten salt through the outlet 340 and may close the valve 342 to prevent removal of molten salt through the outlet 340.

The process schematically shown in FIG. 2 may include any one of, or any combination of: initially filling an ion exchange bath with fresh salt having an increased small cation concentration; intentionally producing dragout; adding a getter material to the ion exchange bath or an electrolytic system to the ion exchange system; and continuously refreshing the ion exchange bath.

The process may include initially filling an ion exchange bath with fresh salt having an increased small cation concentration. In a conventional ion exchange process, the ion exchange bath is initially filled with fresh salt having a small cation concentration of less than about 5.0 wt. %. As used herein, the term "increased small cation concentration" is used to refer to a small cation concentration of greater than about 5.0 wt. %. According to embodiments of the present disclosure, the small cation concentration of the fresh salt may be, for example, greater than about 10 wt. %, or greater than about 15 wt. %, or greater than about 20 wt. % or even greater than about 25 wt. %. The small cation concentration of the fresh salt may be, for example, between about 5.0 wt. % and about 30 wt. %, or between about 10 wt. % and about 25 wt. %, or even between about 15 wt. % and about 20 wt. %.

As previously mentioned, the steady state ion exchange process as described herein includes a start-up period 220 in which the initial glass articles processed in the ion exchange bath achieve a CS and/or CT that is greater than the targeted upper limit 202. Such a start-up period 220 may be reduced or eliminated by adding an increased small cation concentration to the initial salt bath. Alternatively, a sacrificial substrate capable of exchanging small cations into the salt bath may be submerged in the ion exchange bath and processed until the concentration of poisoning cations in the ion exchange bath reaches a level that is capable of achieving a CS and/or CT that is less than the targeted upper limit 202 and greater than the targeted lower limit 204. Such a sacrificial substrate could reduce the need to process glass articles that would not meet final product specifications and could reduce costs associated with the ion exchange process.

Figure 4:
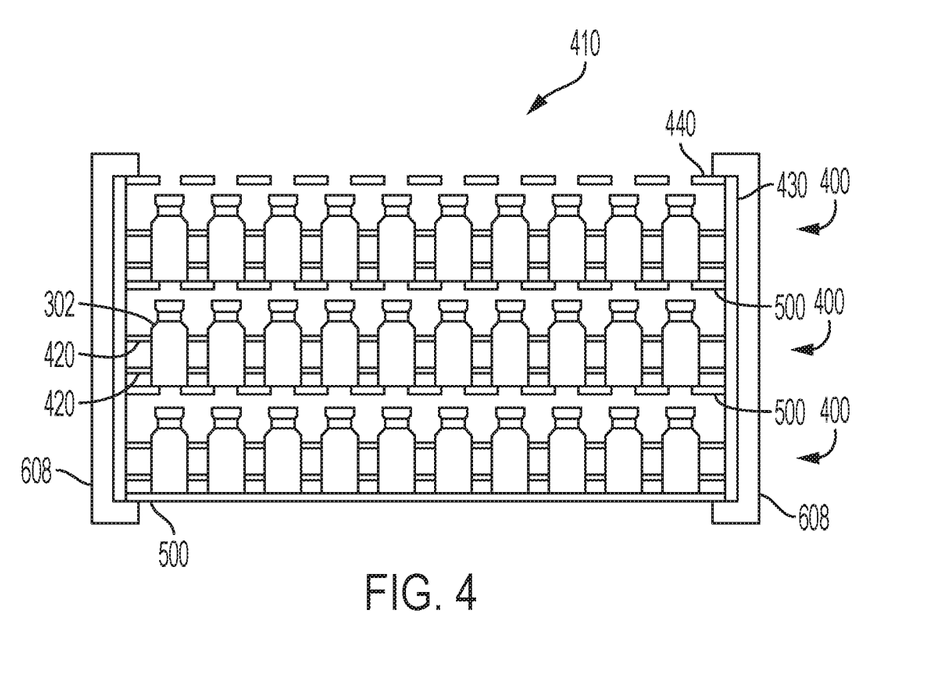
FIG. 4 schematically depicts a cross-sectional view of a cassette assembly in accordance with embodiments of the present disclosure.

According to embodiments of the present disclosure, the ion exchange process may include intentionally producing dragout. While some dragout is expected to be produced during a conventional ion exchange process, as used herein "intentionally producing dragout" refers to taking measures which cause a greater amount of dragout to be produced than is produced by conventional ion exchange processes. Intentionally increasing dragout may include, for example, increasing the surface area of a fixture or carrier which contacts the glass article in the ion exchange bath. FIG. 4, for example, schematically depicts a cross-sectional view of a cassette assembly 410 which may include a plurality of magazine apparatuses 400 stacked adjacently and secured together in a cassette 608. The magazine apparatuses 400 are configured to retain glass articles 302, such as glass vials, during ion exchange processing while allowing for acceptable levels of fluid contact by the salt bath with all areas (interior and exterior) of the glass articles 302 when the magazine apparatus 400 is partially or fully submerged in the salt bath. Each magazine apparatus 400 generally includes a bottom support floor 500, a plurality of glassware-securing members 420, a cover plate 440 and vertical supports 430 that securely connect the bottom support floor 500, the glassware-securing members 420, and may removably secure the cover plate 440.

Figure 5:
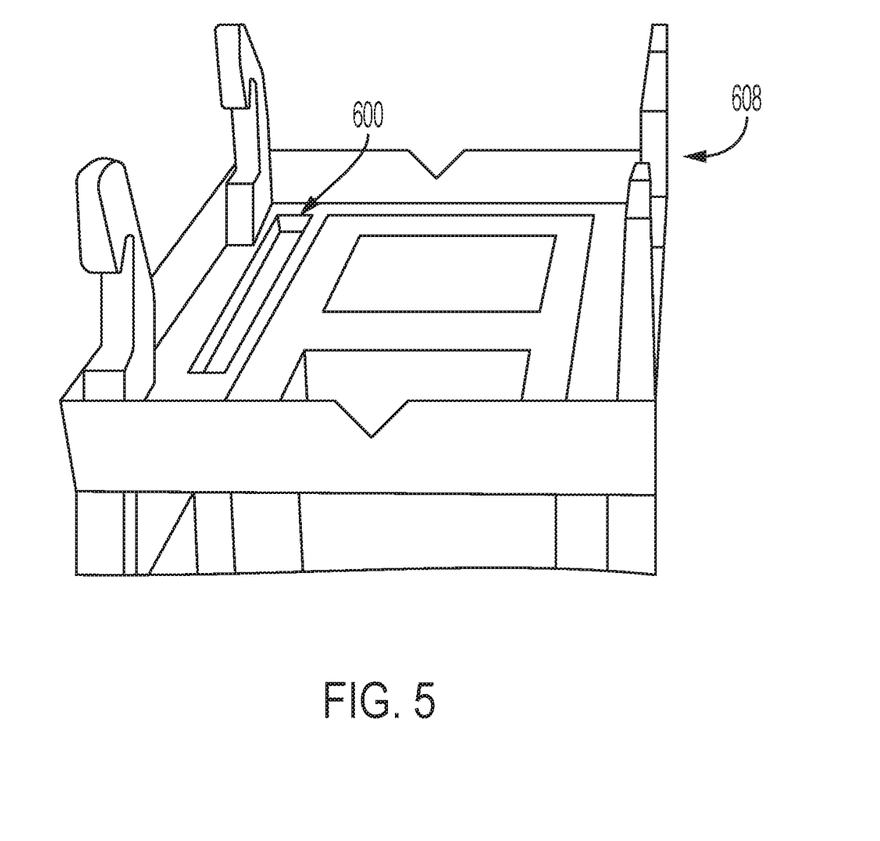
FIG. 5 schematically depicts a cross-sectional view of a cassette assembly in accordance with embodiments of the present disclosure.

The surface area of any of the portions of the cassette assembly 410 may be increased in order to increase the area where salt from the salt bath may adhere and be removed from the bath when the cassette assembly is removed from the bath. Optionally, the fixture or carrier, such as the cassette assembly 410, may include features into which molten salt may settle and which promote removal of salt from the ion exchange bath. For example, FIG. 5 schematically depicts a cross-sectional view of a cassette assembly 410 similar to the cassette assembly of FIG. 4, but further including a channel 600 in the top surface of the cassettes 608. The channel 600 includes an opening at the top surface of the cassette 608 but is otherwise enclosed within the top surface of the cassette 608. Molten salt may settle in the channel during processing of the glass articles and, when the cassette is removed from the salt bath, the molten salt may remain in the channel and also be removed from the salt bath. It should be noted that other features into which molten salt may settle and which promote removal of salt from the ion exchange bath are also contemplated and are not limited to the channel 600 as shown in FIG. 5. For example, the fixture or carrier may be modified to include a feature having a cup-shaped portion which may promote removal of salt from the ion exchange bath as the fixture or carrier is removed from the ion exchange bath.

According to embodiments of the present disclosure, the ion exchange process may include adding a getter material to the ion exchange bath. As previously discussed, the getter material may be any material that selectively removes certain cationic species or reduces the concentration of the cationic species in the ion exchange bath. The getter material may be any of the materials previously described. Similarly, an electrolytic system as described above may be added to the ion exchange system to selectively remove certain cationic species or reduce the concentration of the cationic species in the ion exchange bath.

According to embodiments of the present disclosure, the ion exchange process may include continuously refreshing the ion exchange bath. As used herein, the term "continuously refreshing the ion exchange bath" refers to ion exchanging glass articles in which additional fresh salt is provided, either continuously over some period of time or intermittently over some period of time, to the bath, and simultaneously molten salt is removed, such as through a drain, from the bath. The fresh salt may be fresh salt having an increased small ion concentration as previously described.

The rate at which molten salt in the ion exchange bath is replaced with fresh salt, referred to herein as the rate of replacement, may be any rate appropriate to maintain the steady state conditions of the ion exchange process. The rate of replacement can remain constant over a period of time, or can be altered (i.e., increased or decreased) over the course of the ion exchange process, or any combination thereof. Further, an increase or decrease in the rate of replacement can be applied in any manner, including, but not limited to, a steady alteration over time, e.g., a steady increase during a period of ion exchange, or a series of alterations over time, e.g., a series of steady alterations, a series of stepwise alterations (e.g., the rate of replacement could be increased or decreased in a stepwise manner), or any combination thereof. The timing of the initiation and cessation of an ion exchange period, and of any alterations to the ion exchange process, can be predetermined, e.g., at a set time or interval, or based upon the monitoring of some parameter of the conditions in ion exchange bath. The replacement of molten salt with fresh salt can be applied in a continuous manner or in an intermittent manner. As used herein, continuous replacement is performed continuously for the entire period of an ion exchange process. Alternatively, intermittent replacement is performed for only a fraction of an ion exchange process. For example, in intermittent replacement, a predetermined volume of molten salt is removed from the ion exchange bath and a substantially equal volume of fresh salt is added to the ion exchange bath a predetermined number of times during the ion exchange process. In intermittent replacement, higher rates of addition/removal of fresh salt may be used to perform nearly the same degree of addition of fresh salt and removal of molten salt as in in continuous replacement.

While the present disclosure includes a limited number of embodiments, those skilled in the art, having benefit of this disclosure, will appreciate that other embodiments can be devised which do not depart from the scope of the present disclosure.

What is claimed is:

1. A method for ion exchanging glass articles, the method comprising:
   ion exchanging a plurality of lots in steps within an ion exchange salt bath, wherein each of the plurality of lots comprises at least one glass article retained within a fixture having a surface area in the ion exchange salt bath, and wherein the ion exchange salt bath comprises molten salt;
   after ion exchanging, removing one of the plurality of lots from the ion exchange salt bath wherein dragout is intentionally produced by increasing the surface area of the fixture;
   except for after removing a last lot of the plurality of lots from the ion exchange salt bath, placing a subsequent lot into the ion exchange salt bath;
   after removing the last lot from the ion exchange salt bath, removing substantially an entire volume of molten salt from the ion exchange salt bath; and
   maintaining steady state conditions in the ion exchange salt bath prior to removing substantially the entire volume of salt from the ion exchange salt bath such that at least one of a compressive stress and a central tension of substantially all of the glass articles varies from at least one of a compressive stress and a central tension of any other of the glass articles by less than about 20%.

2. The method of claim 1, wherein the ion exchange salt bath comprises a first cation and a second cation wherein the first cation is larger than the second cation.

3. The method of claim 1 comprising maintaining steady state conditions in the ion exchange salt bath prior to removing substantially the entire volume of salt from the ion exchange salt bath such that at least one of the compressive stress and the central tension of substantially all of the glass articles varies from at least one of the compressive stress and the central tension of any other of the glass articles by less than about 10%.

4. The method of claim 1 comprising maintaining steady state conditions in the ion exchange salt bath prior to removing substantially the entire volume of salt from the ion exchange salt bath such that at least one of the compressive stress and the central tension of substantially all of the glass articles varies from at least one of the compressive stress and the central tension of any other of the glass articles by less than about 5.0%.

5. The method of claim 1 comprising maintaining steady state conditions in the ion exchange salt bath prior to removing substantially the entire volume of salt from the ion exchange salt bath such that at least one of the compressive stress and the central tension of substantially all of the glass articles varies from at least one of the compressive stress and the central tension of any other of the glass articles by less than about 3.0%.

6. The method of claim 1 comprising maintaining steady state conditions in the ion exchange salt bath prior to removing substantially the entire volume of salt from the ion exchange salt bath such that at least one of the compressive stress and the central tension of substantially all of the glass articles varies from at least one of the compressive stress and the central tension of any other of the glass articles by less than about 2.0%.

7. The method of claim 2 further comprising initially filling the ion exchange salt bath with fresh salt having an increased second cation concentration, wherein the increased second cation concentration is greater than about 5.0 wt. %.

8. The method of claim 7, wherein the increased second cation concentration is greater than about 10 wt. %.

9. The method of claim 7, wherein the increased second cation concentration is greater than about 15 wt %.

10. The method of claim 7, wherein the increased second cation concentration is greater than about 20 wt. %.

11. The method of claim 7, wherein the increased second cation concentration is between about 5.0 wt. % and about 30 wt. %.

12. The method of claim 1, further comprising adding a getter material to the ion exchange salt bath.

13. The method of claim 12, wherein the ion exchange salt bath comprises first cations and second cations, the second cations are smaller than the first cations and the getter material comprises a material that selectively removes the smaller cations from the ion exchange salt bath.

14. The method of claim 12, wherein the getter material comprises a material that is larger cation-rich material.

15. The method of claim 12, wherein the getter material comprises a synthetic ceramic material.

16. The method of claim 12, wherein the getter material comprises clay.

17. The method of claim 12, wherein the getter material comprises zeolite.

18. The method of claim 1, further comprising adding an electrolytic system to the ion exchange salt bath.

19. The method of claim 18, wherein the ion exchange salt bath comprises first cations and second cations, the second cations are smaller than the first cations, and the electrolytic system comprises a membrane comprising a material that selectively removes smaller cations from the ion exchange salt bath.

20. The method of claim 1, further comprising continuously refreshing the ion exchange salt bath.

21. The method of claim 20, wherein continuously refreshing the ion exchange salt bath comprises removing a portion of the volume of molten salt from the ion exchange salt bath and adding a substantially equal volume of fresh salt to the ion exchange salt bath.

22. The method of claim 21, wherein removing a portion of the volume of molten salt from the ion exchange salt bath and adding a substantially equal volume of fresh salt to the ion exchange salt bath is performed in a continuous manner.

23. The method of claim 21, wherein removing a portion of the volume of molten salt from the ion exchange salt bath and adding a substantially equal volume of fresh salt to the ion exchange salt bath is performed in an intermittent manner.

24. The method of claim 1, wherein dragout is intentionally produced by providing a channel in a top surface of the fixture to intentionally remove molten salt from the ion exchange salt bath.

25. The method of claim 1, wherein dragout is intentionally produced by providing a cup-shaped portion on the fixture to intentionally remove molten salt from the ion exchange salt bath.

* * * * *

UNITED STATES PATENT AND TRADEMARK OFFICE
CERTIFICATE OF CORRECTION

PATENT NO. : 11,034,613 B2  
APPLICATION NO. : 16/189242  
DATED : June 15, 2021  
INVENTOR(S) : Douglas Clippinger Allan et al.

Page 1 of 1

It is certified that error appears in the above-identified patent and that said Letters Patent is hereby corrected as shown below:

In the Claims

In Column 13, Line 44, Claim 9, delete "15 wt %." and insert -- 15 wt. %. --, therefor.

Signed and Sealed this  
Seventh Day of September, 2021

Drew Hirshfeld  
*Performing the Functions and Duties of the*  
*Under Secretary of Commerce for Intellectual Property and*  
*Director of the United States Patent and Trademark Office*